United States Patent
Park (10) Patent No.: US 9,451,067 B2
(45) Date of Patent: Sep. 20, 2016

(54) PORTABLE TERMINAL AUXILIARY DEVICE HAVING SATELLITE COMMUNICATION FUNCTION

(71) Applicant: Asia Pacific Satellite-Communications Inc., Seoul (KR)

(72) Inventor: Jong In Park, Seoul (KR)

(73) Assignee: Asia Pacific Satellite-Communications Inc., Seoul (KR)

( * ) Notice: Subject to any disclaimer, the term of this patent is extended or adjusted under 35 U.S.C. 154(b) by 0 days.

(21) Appl. No.: 14/394,393

(22) PCT Filed: Apr. 5, 2013

(86) PCT No.: PCT/KR2013/002854
§ 371 (c)(1),
(2) Date: Oct. 14, 2014

(87) PCT Pub. No.: WO2013/154301
PCT Pub. Date: Oct. 17, 2013

(65) Prior Publication Data
US 2015/0147971 A1 May 28, 2015

(30) Foreign Application Priority Data
Apr. 13, 2012 (KR) .................. 10-2012-0038321

(51) Int. Cl.
*H04B 7/185* (2006.01)
*H04B 10/29* (2013.01)
(Continued)

(52) U.S. Cl.
CPC ........... *H04M 1/21* (2013.01); *H04B 7/18563* (2013.01); *H04W 4/008* (2013.01); *H04W 12/06* (2013.01); *H04W 88/06* (2013.01); *H04L 69/40* (2013.01); *H04W 4/22* (2013.01)

(58) Field of Classification Search
CPC ....... H04M 1/21; H04B 1/005; H04B 7/185; H04B 7/18508; H04B 7/1851; H04B 7/1853; H04B 10/29; H04W 88/06; H04W 4/008
See application file for complete search history.

(56) References Cited

U.S. PATENT DOCUMENTS 5,628,049 A * 5/1997 Suemitsu ............... H01Q 1/242
455/11.1
7,558,250 B2 * 7/2009 Little ................. H04B 7/18508
370/316
(Continued)

FOREIGN PATENT DOCUMENTS

EP 0763906 A2 * 3/1997 ............. H04B 7/185
JP 2001-268652 9/2001
(Continued)

*Primary Examiner* — Andrew Wendell
(74) *Attorney, Agent, or Firm* — Cesari and McKenna, LLP (57) ABSTRACT

The present invention comprises: a satellite terminal short-range communication module that performs short-range radio communication with a portable terminal; a satellite RF module which processes signals in order to communicate with a satellite via a satellite antenna; a voice data input and output unit which inputs and outputs voice data; and a satellite terminal control unit which forms a traffic channel through satellite communication via the satellite RF module when a voice call is requested from the portable terminal via the satellite terminal short-range communication module, transmits the voice data inputted through the voice data input and output unit to the satellite RF module, and outputs the voice data inputted by the satellite RF module via the voice data input and output unit.

8 Claims, 6 Drawing Sheets

(51) Int. Cl.
  *H04M 1/21*    (2006.01)
  *H04W 4/00*    (2009.01)
  *H04W 12/06*   (2009.01)
  *H04W 88/06*   (2009.01)
  *H04W 4/22*    (2009.01)
  *H04L 29/14*   (2006.01)

(56) References Cited

U.S. PATENT DOCUMENTS

2005/0215194 A1* 9/2005 Boling ............... H04B 7/18523
                                                        455/3.02
2006/0094349 A1* 5/2006 Slesak ..................... H04B 1/08
                                                        455/3.02
2010/0029325 A1* 2/2010 Wang ................ H04W 72/1215
                                                        455/553.1
2012/0051405 A1* 3/2012 Piesinger ............. H04W 12/02
                                                        375/211
2015/0011220 A1* 1/2015 Buckle ................... C12M 41/48
                                                        455/436
2015/0133189 A1* 5/2015 Mukae ................. H04W 84/06
                                                        455/556.1

FOREIGN PATENT DOCUMENTS

JP          2004-247996          9/2004
KR       10-2009-0017095 A       2/2009
KR       10-2011-0083050 A       7/2011

* cited by examiner

PORTABLE TERMINAL AUXILIARY DEVICE HAVING SATELLITE COMMUNICATION FUNCTION

CROSS REFERENCE TO RELATED APPLICATIONS

This application is the National Stage of International Application No. PCT/KR2013/002854, filed on Apr. 5, 2013, which claims the benefit of Korean Application No. 10-2012-0038321, filed on Apr. 13, 2012. The contents of both applications are hereby incorporated by reference in their entirety.

TECHNICAL FIELD

The present invention relates to an auxiliary device for portable terminals, and more particularly, to an auxiliary device for portable terminals, which has a satellite communication function so as to transmit and receive data through satellite communication even in the event of terrestrial network failure or a breakdown in communication of a portable terminal.

BACKGROUND ART

In general, when a call setup request is received from a mobile communication subscriber, a public switched telephone network subscriber, and the like, a mobile communication system provides a mobile communication service by assigning resources, for example, a channel for setting a call, to form a call.

If an outgoing or incoming call, a handoff call or the like is generated from a mobile communication terminal, a base station transmits a request for processing such a call to a mobile switching center through a base station controller. Then, the mobile switching center receives the request for processing the call and performs a call process.

However, if there is a deluge of call processes or there is a breakdown in devices of a core network, system failure can occur. Such system failure can interrupt service or cause a setback in providing service.

As such, if communication network failure occurs, various services and processes are stopped and restoration is performed. If the system is completely restored from the failure, the system is normally operated by restarting various devices of the core network.

The background technique of the present invention is disclosed in Korean Patent Publication No. 10-2001-0054506 (Jul. 2, 2001).

DISCLOSURE

Technical Problem

However, in the case of restoring a terrestrial network, the network can be overloaded or another system failure can occur. In particular, it takes much time to restore the system.

Therefore, users cannot use a communication service until the terrestrial network is restored from the failure. Further, users have no choice but to wait until the terrestrial network is restored by a service provider.

In addition, a conventional mobile terminal must be repaired in a repair shop when failure occurs due to a breakdown or the like. In this case, it is difficult to cope with emergency.

Further, a conventional mobile terminal cannot communicate with another communication terminal upon discharge of a battery thereof. At this time, since a separate charge unit is needed, it is impossible to charge the battery immediately on site and thus the mobile terminal cannot be used.

The present invention has been conceived to solve such problems in the art and it is an aspect of the present invention to provide an auxiliary device for portable terminals, which has a satellite communication function so as to transmit and receive data through satellite communication even in the event of terrestrial network failure or a breakdown in communication of a portable terminal.

It is another aspect of the present invention to provide an auxiliary device for portable terminals, which allows a key input device and a display device of an existing portable satellite phone to be replaceable by a mobile terminal such as a smartphone terminal and the like, thereby reducing manufacturing costs of a portable satellite phone.

It is a further aspect of the present invention to provide an auxiliary device for portable terminals, which allows an urgent call with an external communication terminal through satellite communication even though normal communication is impossible due to portable terminal failure.

It is yet another aspect of the present invention to provide an auxiliary device for portable terminals, which can supply power for charging a battery of a mobile terminal upon discharge of the battery.

Technical Solution

In accordance with one aspect of the present invention, there is provided a portable terminal auxiliary device having a satellite communication function, including: a satellite terminal short-range wireless communication module performing short-range wireless communication with a portable terminal; a satellite radio frequency (RF) module performing satellite communication through a satellite antenna; a voice data input/output unit for inputting and outputting voice data; and a satellite terminal controller forming a traffic channel based on satellite communication through the satellite RF module, transmitting voice data received through the voice data input/output unit to the satellite RF module, and outputting the voice data received in the satellite RF module through the voice data input/output unit in response to a request for a voice call from the mobile terminal through the satellite terminal short-range wireless communication module.

The satellite terminal short-range wireless communication module may include a Bluetooth module or a WiFi module.

The satellite RF module may convert a satellite signal received through the satellite antenna to be transmitted to the portable terminal, and convert data received from the mobile terminal through the satellite terminal short-range wireless communication module into a satellite signal to be transmitted through the satellite antenna.

The satellite terminal controller may transmit message data through the satellite RF module in response to a request for message data from the mobile terminal through the satellite terminal short-range wireless communication module.

The satellite terminal controller may transmit message data received through the satellite RF module to the mobile terminal through the satellite terminal short-range wireless communication module.

The satellite terminal controller may further include an urgent call key for requesting an urgent call, and the mobile terminal controller may place a satellite call at a previously stored phone number when the urgent call key is input.

The auxiliary device may further include: a power supply outputting power of a satellite terminal battery; and a charge unit supplying power output through the power supply to a mobile terminal battery of the mobile terminal and charging the mobile terminal battery.

The power supply may include: a power controller switching power output from the satellite terminal battery; a power supply key switching the power controller; and a satellite terminal power connector connecting the satellite terminal battery to the charge unit and supplying power from the satellite terminal battery to the charge unit.

Advantageous Effects

According to the present invention, since the auxiliary device employs satellite communication, it is possible not only to place a voice call, but also to transmit and receive a text message even in the event of terrestrial network failure.

According to the present invention, the auxiliary device allows a key input device and a display device of an existing portable satellite phone to be replaceable by a mobile terminal such as a smartphone terminal and the like, thereby reducing manufacturing costs of a portable satellite phone.

According to the present invention, the auxiliary device enables an urgent call with an external communication terminal through satellite communication even though normal communication is impossible due to portable terminal failure.

According to the present invention, the auxiliary device can supply power for charging a battery of a mobile terminal upon discharge of the battery.

BEST MODE

Hereinafter, embodiments of the present invention will be described in detail with reference to the accompanying drawings. It should be noted that the drawings are not to precise scale and may be exaggerated in thickness of lines or size of components for descriptive convenience and clarity only. In addition, the terms used herein are defined by taking functions of the present invention into account and can be changed according to user or operator custom or intention. Therefore, definition of the terms should be made according to the overall disclosure set forth herein.

Figure 1:
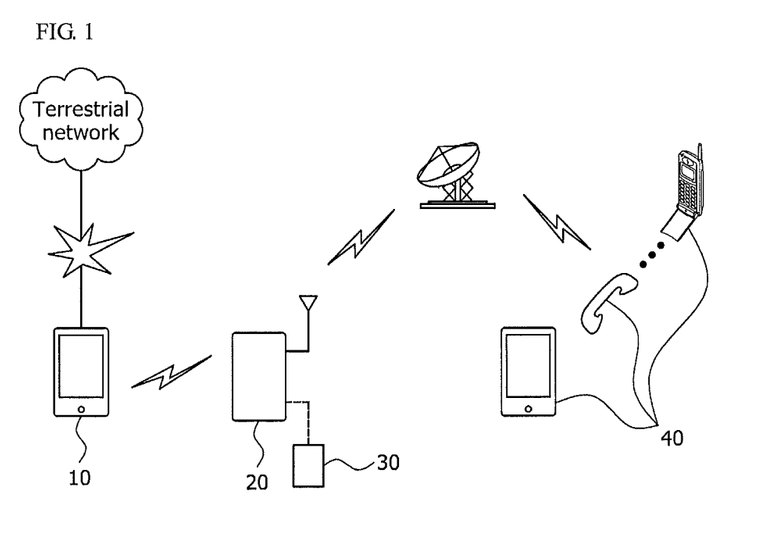
FIG. 1 is a diagram of service flow of an auxiliary device for mobile terminals having a satellite communication function according to one embodiment of the present invention.
Figure 2:
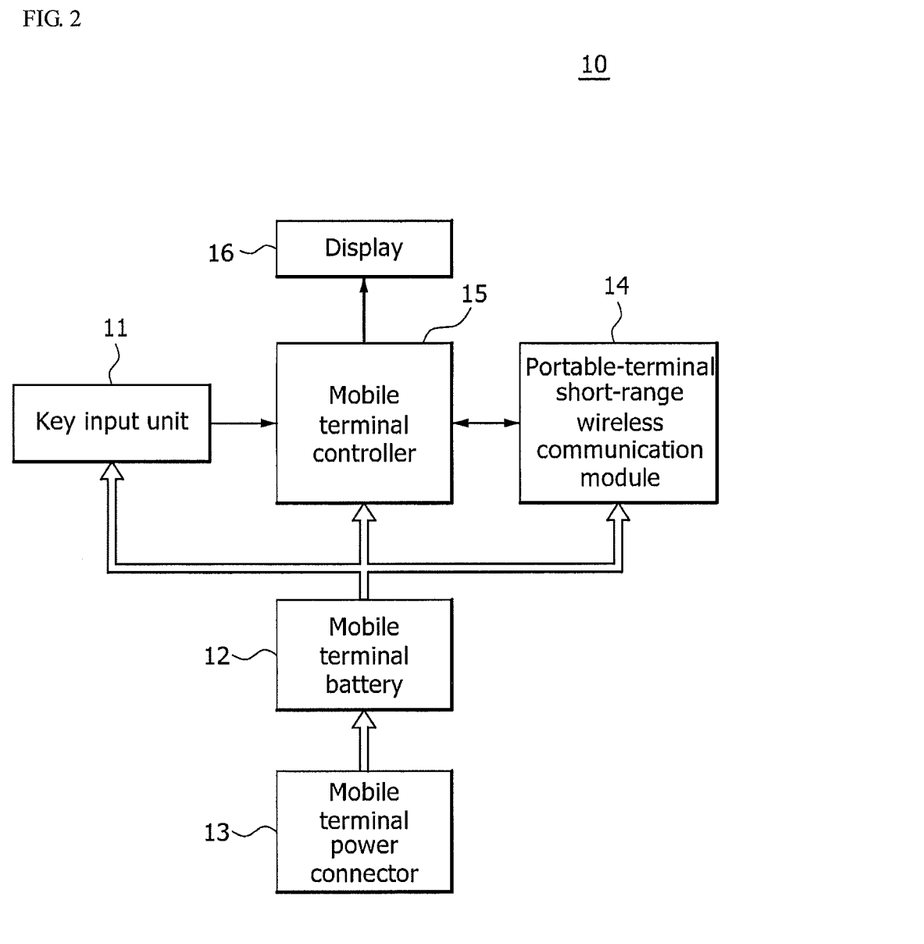
FIG. 2 is a block diagram of a mobile terminal according to one embodiment of the present invention.
Figure 3:
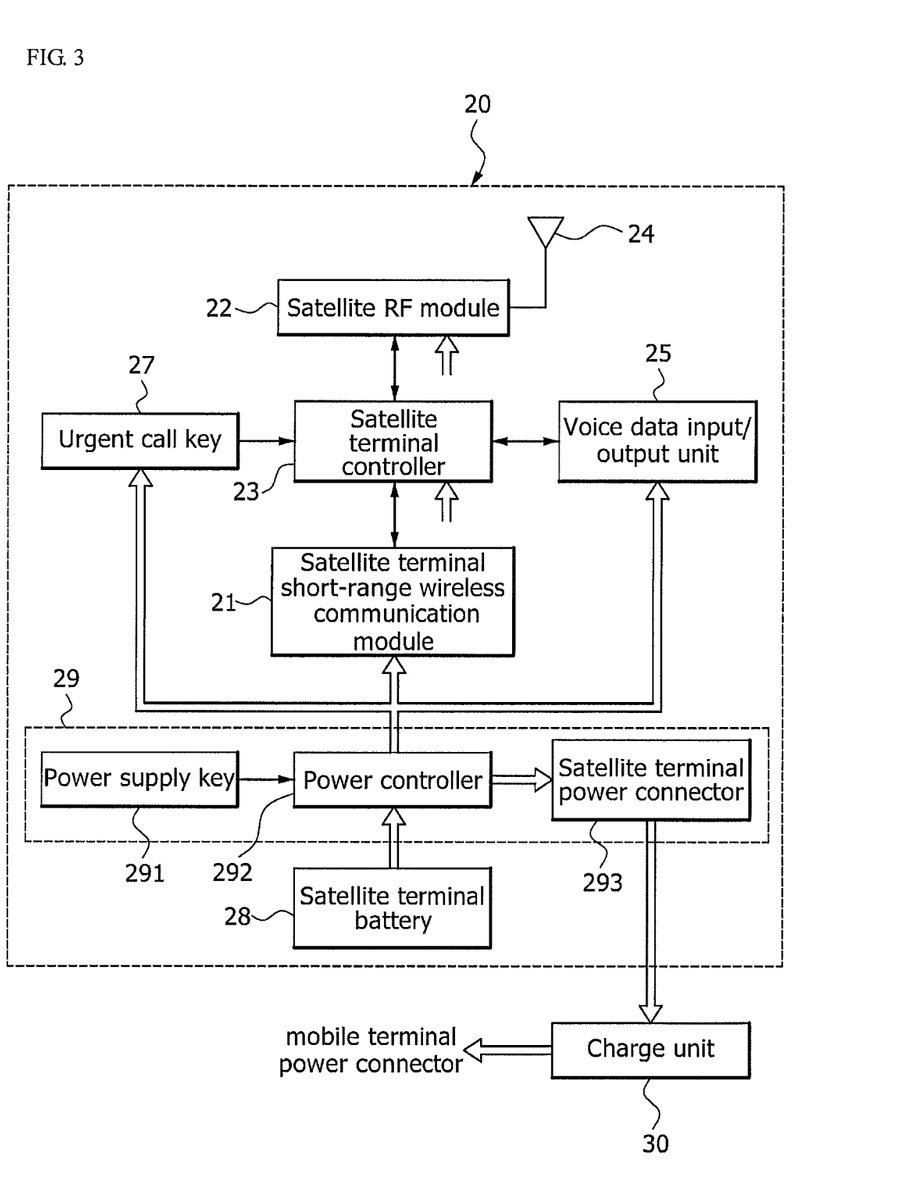
FIG. 3 is a block diagram of an auxiliary device for mobile terminals having a satellite communication function according to one embodiment of the present invention.
Figure 4:
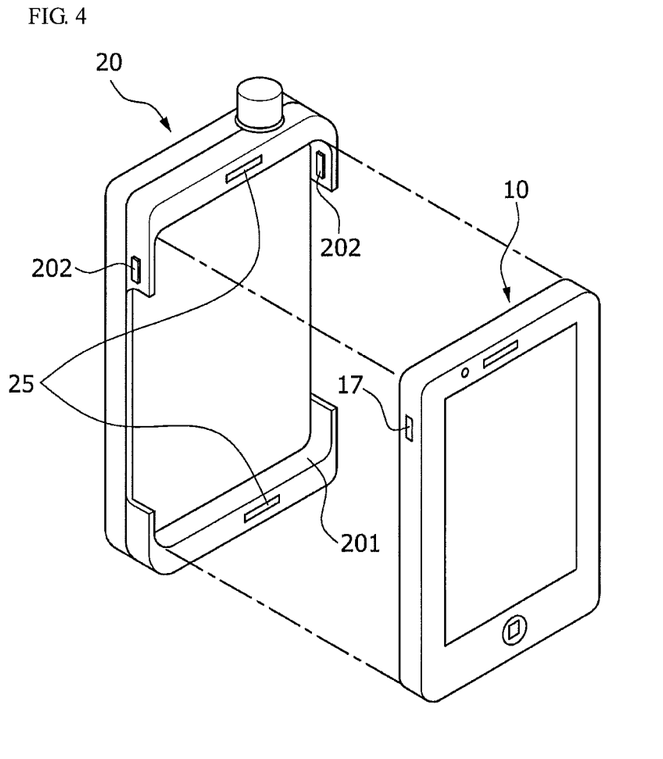
FIG. 4 is an exploded perspective view of the auxiliary device for mobile terminals having a satellite communication function according to the embodiment of the present invention.
Figure 5:
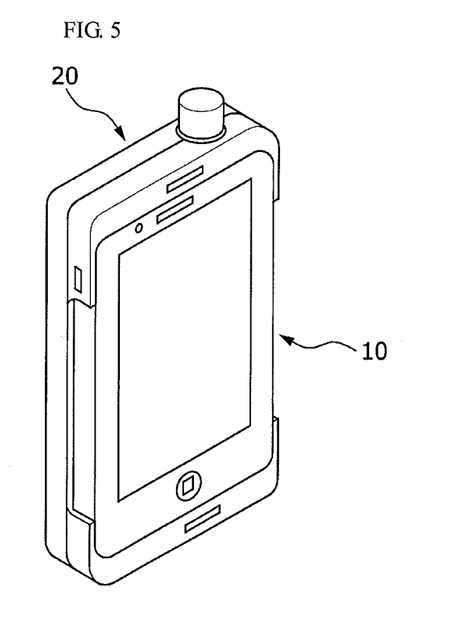
FIG. 5 is a perspective view of the auxiliary device for mobile terminals having a satellite communication function according to the embodiment of the present invention.

FIG. 1 is a diagram of service flow of an auxiliary device for mobile terminals having a satellite communication function according to one embodiment of the present invention, FIG. 2 is a block diagram of a mobile terminal according to one embodiment of the present invention, FIG. 3 is a block diagram of an auxiliary device for mobile terminals having a satellite communication function according to one embodiment of the present invention, FIG. 4 is an exploded perspective view of the auxiliary device for mobile terminals having a satellite communication function according to the embodiment of the present invention, and FIG. 5 is a perspective view of the auxiliary device for mobile terminals having a satellite communication function according to the embodiment of the present invention.

Referring to FIG. 1, a mobile terminal 10 performs wireless communication with other communication terminals 40 through a terrestrial network. The mobile terminal 10 is connected to a satellite terminal 20, which performs wireless communication through a satellite communication network, via a short-range wireless communication scheme, and transmits or receives various data, commands, and the like.

Even in the event where normal communication is impossible through the terrestrial network due to terrestrial network failure, the mobile terminal 10 can perform wireless communication with other communication terminals 40 through the satellite communication network of the satellite terminal 20.

To this end, the mobile terminal 10 includes a portable-terminal short-range wireless communication module 14 capable of performing short-range wireless communication with the satellite terminal 20.

As the short-range wireless communication scheme, Bluetooth communication is used, without being limited thereto. Alternatively, as one of institute of electrical and electronics engineers (IEEE) 802.15.4 standards supporting short-range communication, there may be used Zigbee communication for ubiquitous computing and short-range communication within 10~20 m in a wireless networking field such as home, office, etc.; WiFi communication of a short-range communication network for high-speed Internet within a predetermined distance from a location where an access point (AP) is installed; and near field communication (NFC) for data transmission between terminals within a short distance of 10 cm through a contactless short-range wireless communication module using a frequency of 13.56 MHz.

Further, the terrestrial network is a communication network based on a communication scheme such as code division multiple access (CDMA), time division multiple access (TDMA), wideband code division multiple access (WCDMA), long term evolution (LTE), and the like, and employs both synchronous communication and asynchronous communication.

If the mobile terminal 10 is inoperative due to discharge of a mobile terminal battery 12, the mobile terminal 10 performs charging by receiving power from a satellite terminal battery 28 of the satellite terminal 20, thereby preventing the mobile terminal battery 12 from being inoperative due to discharge of the battery.

The satellite terminal 20 performs a call process for satellite communication, converts various data received from the mobile terminal 10 via a short-range wireless communication scheme into a satellite signal, and outputs the signal through a satellite antenna 24. The satellite antenna 24 converts the received satellite signal so as to be transmitted by the short-range wireless communication scheme and transmits the signal to the mobile terminal 10.

Thus, when normal communication is impossible due to terrestrial network failure, the satellite communication apparatus having a short-range wireless interface according to one embodiment of the invention is switched into a satellite communication mode using a satellite terminal 20 to be connected to other communication terminals 40.

In addition, when failure occurs in the mobile terminal 10 or normal operation is impossible due to discharge of the mobile terminal battery 12, the satellite terminal 20 allows an urgent call to be performed through satellite communication, or supplies power from a satellite terminal battery 28 disposed therein to the mobile terminal battery 12.

A charge unit 30 is connected to the satellite terminal 20 and supplies the power from the satellite terminal battery 28 to the mobile terminal battery 12 to charge the mobile terminal 10.

According to one embodiment of the invention, as shown in FIG. 2, a smartphone or the like may be employed as the mobile terminal 10, in which an application program for supporting data such as messages or voice to be transmitted and received through short-range wireless communication is embedded, thereby transmitting and receiving data through short-range wireless communication when the application program is executed. The mobile terminal 10 may employ the smartphone or the like that can perform schedule management, data communication such as facsimile transmission and Internet access, and multimedia functions in addition to a general call function.

The mobile terminal 10 includes a key input unit 11, the mobile terminal battery 12, a mobile terminal power connector 13, the portable-terminal short-range wireless communication module 14, a mobile terminal controller 15, and a display 16.

The key input unit 11 inputs various key signals corresponding to user key control. Therefore, a user can execute the application program through the key input unit 11, and then input a receive/send request, a called party number, a message, etc.

In addition, the key input unit 11 sets a phone number of a receiver's communication terminal 40 in order to place an urgent call for emergency to the satellite terminal 20.

The portable-terminal short-range wireless communication module 14 serves to perform short-range wireless communication with the satellite terminal 20, and includes a Bluetooth module, a WiFi module, or other communication modules based on the short-range wireless communication scheme.

That is, the portable-terminal short-range wireless communication module 14 may employ Bluetooth to perform wireless data communication. Alternatively, the portable-terminal short-range wireless communication module 14 may employ one of IEEE 802.15.4 standards supporting short-range communication, such as Zigbee communication for ubiquitous computing and short-range communication within 10~20 m in a wireless networking field such as home, office, etc.; WiFi communication of a short-range communication network for high-speed Internet within a predetermined distance from a location where an AP is installed; and NFC for data transmission between terminals within a short distance of 10 cm through a contactless short-range wireless communication module using a frequency of 13.56 MHz.

The portable-terminal short-range wireless communication module 14 transmits a key signal input through the key input unit 11 from the mobile terminal controller 15 to the satellite terminal 20, and inputs data from the satellite terminal 20 to the mobile terminal controller 15. In this case, the portable-terminal short-range wireless communication module 14 authenticates connection with the satellite terminal 20 in accordance with a preset communication format, for example, Bluetooth, and performs short-range wireless data communication after authentication is completed.

The mobile terminal controller 15 receives a key signal through the key input unit 11, transmits the key signal to the satellite terminal 20 through the portable-terminal short-range wireless communication module 14, and outputs data received through the portable-terminal short-range wireless communication module 14 to the display 16.

The display 16 displays information related to operations of the mobile terminal controller 15, and in particular displays various pieces of data, for example, message data, received from the satellite terminal 20 through the portable-terminal short-range wireless communication module 14.

According to one embodiment of the invention, the mobile terminal 10 transmits various key signals for a satellite call to the satellite terminal 20, and inputs/outputs various data such that a user can place a satellite call.

In addition, if the phone number of the receiver's communication terminal 40 is input for an urgent call through the key input unit 11 without the mobile terminal 10, the phone number is transferred to the satellite terminal 20 through the portable-terminal short-range wireless communication module 14 such that the satellite terminal 20 can store this phone number.

According to one embodiment of the invention, the auxiliary device for mobile terminals having a satellite communication function includes the satellite terminal 20 and the charge unit 30, as shown in FIG. 3.

As shown in FIG. 3, the satellite terminal 20 includes a satellite terminal short-range wireless communication module 21, a satellite RF module 22, a satellite terminal controller 23, a satellite antenna 24, a voice data input/output unit 25, an urgent call key 27, the satellite terminal battery 28, and a power supply 29.

The satellite terminal short-range wireless communication module 21 performs short-range wireless communication with the mobile terminal 10 and inputs various key signals from the mobile terminal 10 to the satellite terminal controller 23. Further, the satellite terminal short-range wireless communication module 21 transmits data received from the satellite terminal controller 23 to the mobile terminal 10. The satellite terminal short-range wireless communication module 21 authenticates connection with the mobile terminal 10 and performs short-range wireless data communication after authentication is completed.

For example, the satellite terminal short-range wireless communication module 21 may employ various communication modules such as a Bluetooth module, a WiFi module, and the like, based on the short-range wireless communication scheme.

That is, the satellite terminal short-range wireless communication module 21 may use Bluetooth to perform wireless data communication. Alternatively, the satellite terminal short-range wireless communication module 21 may use one of IEEE 802.15.4 standards supporting short-range communication, such as Zigbee for ubiquitous computing and short-range communication within 10~20 m in a wireless networking field such as home, office, etc.; WiFi of a short-range communication network for high-speed Internet within a predetermined distance from a location where an AP is installed; and NFC for data transmission between terminals within a short distance of 10 cm through a contactless short-range wireless communication module using a frequency of 13.56 MHz.

The satellite RF module 22 serves to perform a signal process such that wireless communication can be implemented through the satellite antenna 24. That is, in response to a satellite signal from a satellite through the satellite antenna 24, the satellite RF module 22 inputs an in-phase/quadrature phase (I/Q) signal into the mobile terminal controller 15 by converting the satellite signal into an intermediate frequency signal and then converting the intermediate frequency signal into the I/Q signal of a baseband digital signal, or transmits the satellite signal through the satellite antenna 24 by converting the I/Q signal of the baseband digital signal into an intermediate frequency signal and converting the intermediate frequency signal into the satellite signal.

Thus, the satellite RF module 22 maintains a communication channel frequency through the foregoing process. To this end, the satellite RF module performs matched filtering, generation of an I/Q signal, maintenance of system reference timing and communication channel frequency, power control of an RF transmitter, and the like.

It can be easily conceived by those skilled in the art to generate the satellite signal through the satellite RF module 22, output the satellite signal through the satellite antenna 24, and process the received satellite signal in the satellite antenna 24, and thus repeated descriptions thereof will be avoided.

The satellite antenna 24 transmits a satellite signal generated in the satellite RF module 22 to a satellite, and transmits the satellite signal received from the satellite to the satellite RF module 22. The satellite antenna 24 may be internally or externally provided.

The voice data input/output unit 25 receives user voice data, converts the voice data into an electric signal, and inputs the electric signal to the satellite terminal controller 23. Further, the voice data input/output unit 25 processes and outputs the input voice data of the satellite terminal controller 23, thereby allowing a user to place a voice call.

The urgent call key 27 inputs a key signal requesting an urgent call to the satellite terminal controller 23 in emergency situations.

The satellite terminal battery 28 supplies power to the charge unit 30 via the power supply 29 so as to charge the mobile terminal battery while supplying power to the satellite terminal.

The power supply 29 includes a power supply key 291, a power controller 292, and a satellite terminal power connector 293.

The power controller 292 is connected to the satellite terminal battery 28 and switches power to be supplied from the satellite terminal battery 28 to the charge unit 30 through the satellite terminal connector 293.

The power supply key 291 switches the power controller 292 such that power can be supplied from the satellite terminal battery 28 to the satellite terminal power connector 293.

The satellite terminal power connector 293 is mechanically connected to the charge unit 30.

The power controller 292 of the power supply 29 switches the power to be supplied from the satellite terminal battery 28 to the satellite terminal power connector 293 when a user controls the power supply key 291.

Thus, power is supplied to the charge unit 30 through the satellite terminal power connector 293, whereby the charge unit 30 can charge the portable battery 12 with power supplied through the satellite terminal power connector 293.

The satellite terminal controller 23 stores a driving program for operation of the satellite terminal 20, setting data input by the mobile terminal 10, phone-number data, phone numbers for urgent calls, and the like.

The satellite terminal controller 23 performs various functions such as placing a voice call, transmitting/receiving a message transmission, and the like, in response to key signals received through the satellite terminal short-range wireless communication module 21. To this end, the satellite terminal controller 23 controls a call process for a satellite call, processes data received through the satellite terminal short-range wireless communication module 21 and voice data received through the voice data input/output unit 25, inputs the data to the satellite RF module 22, and transmits the input data from the satellite RF module 22 to the satellite terminal short-range wireless communication module 21 and the voice data input/output unit 25 in accordance with the input data from the satellite RF module 22. In this case, the satellite terminal controller 23 extracts authenticated connection information, transmits the connection information to the mobile terminal 10 through the satellite terminal short-range communication module 22, and stores the authenticated information of the mobile terminal 10 upon receiving recognition information of the mobile terminal 10 through the satellite terminal short-range communication module 22.

That is, upon receiving a called party number, a call key signal or message data through the satellite terminal short-range wireless communication module 21, the satellite terminal controller 23 inputs the received data into the satellite RF module 22 such that the satellite RF module 22 can process and transmit the called party number, the call key signal or the message data to the satellite through the satellite antenna 24. Thus, the satellite terminal controller 23 forms a traffic channel for a voice call, or transmits a message.

If user voice data is input through the voice data input/output unit 25, the satellite terminal controller 23 inputs the user voice data to the satellite RF module 22 such that the satellite RF module 22 can process and transmit the voice data to the satellite through the satellite antenna 24. Further, receiver voice data input to the satellite RF module 22 is input to the voice data input/output unit 25, thereby allowing a user to place a voice call.

In addition, when the satellite RF module 22 receives receiver message data, the message data is input to the mobile terminal 10 such that the mobile terminal 10 can output the message data, thereby allowing a user to recognize the message data.

Further, various data can be transmitted and received between the mobile terminal 10 and the satellite terminal 20 via the short-range wireless communication scheme.

Even in the case of terrestrial network failure, the satellite terminal 20 performs satellite communication, thereby making it possible to place a voice call and transmit and receive message data. That is, the mobile terminal 10 transmits the input called party number and call-request, message data, and the like to a receiver's communication terminal 40 and outputs receiver voice data, message data, and the like, thereby making it possible to place a voice call or transmit or receive the message data through satellite communication.

Since the voice call is easily placed through satellite communication, there is no need for various devices or modules for inputting a key signal or a moving picture, and the like. Further, it is possible to simplify manufacture of the satellite terminal 20 and reduce manufacturing costs.

When an urgent call key 27 is input, the satellite terminal controller 23 controls the call process for a satellite call at a previously stored phone number to transmit and receive various voice data through the satellite RF module 22, thereby placing the satellite call. In this case, the phone number of a receiver's communication terminal 40 is previously stored and may be set through the mobile terminal 10 by a user.

If a user connects the charge unit 30 to the satellite terminal power connector 293 and the mobile terminal power connector and controls the power supply key 291, the power controller 292 switches power to be supplied from the satellite terminal battery 28 to the mobile terminal battery 12, thereby charging the mobile terminal battery 12.

Therefore, it is possible to achieve immediate charge of the mobile terminal battery even in the case where the mobile terminal battery 12 disposed inside the mobile terminal 10 is discharged to make the mobile terminal 10 inoperative.

The satellite terminal 20 is formed with a cradle 201 to mount the mobile terminal 10 on a front side thereof. The cradle 201 is provided at one side thereof with a holding unit 202 such that a groove 17 formed on one side of the mobile terminal 10 can be coupled and fastened thereto.

Figure 6:
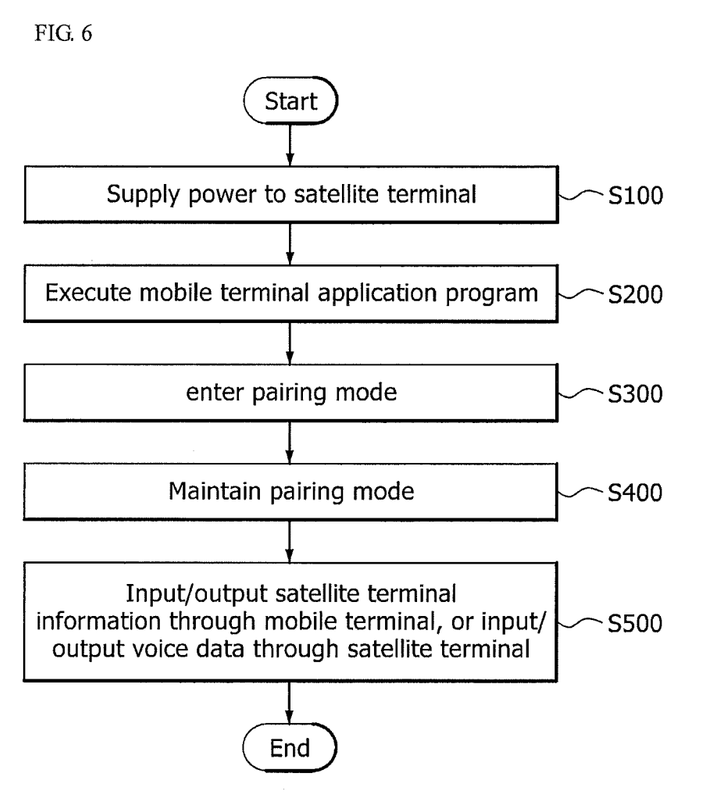
FIG. 6 is a flowchart showing operation of the auxiliary device for mobile terminals having a satellite communication function according to the embodiment of the present invention.

FIG. 6 is a flowchart illustrating operation of the auxiliary device for mobile terminals having a satellite communication function according to the embodiment of the invention.

A satellite communication connection method based on short-range communication according to one embodiment of the invention includes: by a satellite terminal battery 28, supplying power to a satellite terminal 20 (S100), by a mobile terminal 10, executing an application program for satellite communication (S200), by a satellite terminal 20 and the mobile terminal 10, entering a pairing mode after performing authentication for short-range communication, and maintaining a paired state (S300, S400), and by the satellite terminal 20 and the mobile terminal 10, transmitting and receiving data (S500).

In operation S100, the satellite terminal 20 for performing satellite communication determines whether recognition information of the mobile terminal 10 performing short-range wireless communication is detected, when receiving power.

In operation S200, the mobile terminal 10 for performing short-range wireless communication with the satellite terminal 20 determines whether a user input for executing the application program is detected, when receiving power.

In operation S300, the mobile terminal 10 executes an access program in response to an user input for executing the application program, enters the pairing mode for wireless communication, transmits recognition information of the mobile terminal 10 through the portable-terminal short-range wireless communication module 14, recognizes the satellite terminal 20 based on connection authenticated information from the satellite terminal 20, and outputs a wireless signal to the recognized satellite terminal 20.

Additionally, in operation S300, the satellite terminal 20 recognizes the mobile terminal 10 based on the recognition information of the mobile terminal 10 by receiving the recognition information from the mobile terminal 10 and entering the pairing mode for wireless communication, and outputs the preset connection-authenticated information of the satellite terminal 20, so that the satellite terminal 20 and the mobile terminal 10 can perform connection authentication.

In operation S400, when connection-authentication in S300 is completed, the satellite terminal 20 and the mobile terminal 10 maintain the paired state in which short-range wireless communication therebetween is implemented.

In operation S500, the mobile terminal 10 transmits data received through the key input unit 11 to the satellite terminal 20 through short-range wireless communication such that the data can be input as an operation signal for satellite communication. Additionally, the mobile terminal 10 receives a data signal from the satellite terminal 20 through short-range wireless communication, and outputs the data signal through the display 16 of the mobile terminal 10. In this case, the mobile terminal 10 operates as a key input device and a display device for operating the satellite terminal 20.

Further, the satellite terminal 20 transmits input voice data to other communication terminals 40 through the satellite communication mode and outputs voice data received from other communication terminals 40 through the satellite communication mode.

Thus, an interface based on the short-range communication is implemented without physical connection between the mobile terminal and the satellite terminal which use the terrestrial communication network, whereby satellite communication can be performed.

Although the present invention has been described with reference to some embodiments in conjunction with the accompanying drawings, it should be understood that these embodiments are provided for illustration only, and that various modifications, variations, and alterations can be made without departing from the spirit and scope of the present invention. Therefore, the scope of the present invention should be limited only by the accompanying claims and equivalents thereof.

The invention claimed is:

1. A portable terminal auxiliary device having a satellite communication function, comprising:
    a satellite terminal short-range wireless communication module performing short-range wireless communication with a portable terminal configured to communicate with one or more other devices over a terrestrial network;
    a satellite radio frequency (RF) module performing satellite communication through a satellite antenna;
    a voice data input/output unit for inputting and outputting voice data;
    a satellite terminal controller forming a traffic channel based on the satellite communication through the satellite RF module, transmitting the voice data received through the voice data input/output unit to the satellite RF module, and outputting the voice data received in the satellite RF module through the voice data input/output unit in response to a failure of the terrestrial network and a request for a voice call from the portable terminal through the satellite terminal short-range wireless communication module;
    a power supply outputting power of a satellite terminal battery; and
    a charge unit supplying power output through the power supply to a portable terminal battery of the portable terminal and charging the portable terminal battery.

2. The portable terminal auxiliary device according to claim 1, wherein the satellite terminal short-range wireless communication module comprises a Bluetooth module or a WiFi module.

3. The portable terminal auxiliary device according to claim 1, wherein the satellite RF module converts a satellite signal received through the satellite antenna to be transmitted to the portable terminal, and converts data received from the portable terminal through the satellite terminal short-range wireless communication module into a satellite signal to be transmitted through the satellite antenna.

4. The portable terminal auxiliary device according to claim 1, wherein the satellite terminal controller transmits message data through the satellite RF module in response to a request for message data from the portable terminal through the satellite terminal short-range wireless communication module.

5. The portable terminal auxiliary device according to claim 1, wherein the satellite terminal controller transmits message data received through the satellite RF module to the portable terminal through the satellite terminal short-range wireless communication module.

6. The portable terminal auxiliary device according to claim 1, wherein the satellite terminal controller further comprises an urgent call key for requesting an urgent call, and the portable terminal controller places a satellite call at a previously stored phone number when the urgent call key is input.

7. The portable terminal auxiliary device according to claim 1, wherein the power supply comprises a power controller switching the power from the satellite terminal battery; a power supply key switching the power controller; and a satellite terminal power connector connecting the satellite terminal battery to the charge unit and supplying the power from the satellite terminal battery to the charge unit.

8. The portable terminal auxiliary device according to claim 1, further comprising a power supply key that receives input to switch a power controller to provide the power from the satellite terminal battery to the charge unit that charges the portable terminal battery of the portable terminal.

\* \* \* \* \*